INVENTORS.
Henry Magnuski
Edwin Dyke
BY
Mueller & Aichele
Attys.

Nov. 12, 1957 H. MAGNUSKI ET AL 2,813,198

MICROWAVE SYSTEM

Filed Sept. 28, 1954 2 Sheets-Sheet 2

INVENTORS.
Henry Magnuski
Edwin Dyke
BY
Mueller & Aichele
Attys.

United States Patent Office 2,813,198

Patented Nov. 12, 1957

2,813,198

MICROWAVE SYSTEM

Henry Magnuski, Chicago, and Edwin Dyke, Brookfield, Ill., assignors to Motorola, Inc., Chicago, Ill., a corporation of Illinois Application September 28, 1954, Serial No. 458,730

10 Claims. (Cl. 250—13)

This invention relates generally to radio communication systems and more particularly to microwave relay systems wherein dual frequency transmission and reception are provided between adjacent stations.

Microwave relay systems have been used for providing reliable multi-channel communication over relatively long distances. In such microwave relays systems failure of communication may result because the transmitted signals are attenuated due to atmospheric conditions or the like resulting in what is known as fading. It has been found that fading will not occur on two different relatively widely spaced frequencies at the same time. This is because both frequencies will follow identical paths during normal propagation and also during periods of multipath propagation. Then if during the fading periods the paths differ in length by a certain number of wave lengths in terms of the first frequency, the path length difference in number of wave lengths at the second frequency will be different from the certain number. Accordingly, cancellation at the two frequencies will not take place simultaneously.

To take advantage of the above, the use of dual frequency or frequency diversity systems has been proposed wherein transmissions over a predetermined link are provided at two different frequencies and the transmission which is most efficient at any time is utilized. In such systems it is desired to hold the cost to a minimum and for this reason, it is preferred to connect the two transmitters required for dual frequency transmission and the two receivers required for dual frequency reception, which are at the same end of any one relay link, to a single antenna. However, difficulty has been encountered in that the waves transmitted and/or received by one unit will tend to be diverted through the wave guides connected to the other units so that substantial attenuation in the signal is encountered.

It is therefore an object of the present invention to provide a system for connecting two transmitters and two receivers, all operating at different frequencies, to the same antenna without causing interference between the signals of the various units.

A further object of the invention is to provide a wave guide structure for connecting two units, each including a transmitter and receiver, to the same antenna wherein the effective lengths of the branch wave guides are controlled so that they form stubs which reflect the frequencies from the other units without substantially attenuating the same.

Another object of the invention is to provide a wave guide structure for coupling a plurality of units to a single wave guide including gate or switch structures for isolating various wave guide branches to facilitate tuning or other adjustment of units connected to the branches.

A feature of the invention is the provision of a wave guide structure for connecting two transmitters and two receivers, all operating on different frequencies, to a single antenna, with the wave guide structure including cavity filters and adjustable phase shifters so that the frequency of each unit is rejected by the other units without substantial attenuation.

Another feature of the invention is the provision of a Y-shaped wave guide structure for coupling two transmitter-receiver units to a single antenna wherein the branches coupled to the units include gates for cutting off of wave guide portions and phase shifters for varying the effective length of the wave guide portions when connected.

A further feature of the invention is the provision of a dual frequency microwave relay station including two units each having transmitter and receiver portions in which the receiver portions are constructed to reject the transmitter frequencies and include cavities for selecting the received frequency and the transmitter portions include adjustable phase shifters so that the effective length of the transmitter portion can be adjusted to reject the receiver frequency, with the two units being connected to a common antenna by wave guide branches having phase shifters therein so that each main unit and the wave guide coupled thereto forms a stub for the other unit. The transmitter portions may also include cavities for rejecting the receiver frequency of the other unit.

Further objects, features and the attending advantages of the invention will be apparent from a consideration of the following description when taken in connection with the accompanying drawings, in which.

In practicing the invention there is provided microwave radio apparatus which may be utilized at one end of a radio communication system, which may be a simple two terminal system or a link in a radio relay system. The apparatus includes two units which may be substantially identical each having a transmitter and receiver which operate at different frequencies. The transmitter-receiver units are formed by wave guide structures, with the receiver portion having a spacer for controlling the length of the wave guide, a highly selective cavity filter for selecting the receiver frequency, and a local oscillator and mixer structure for converting the received frequency to an intermediate frequency which may be utilized in a known manner. The transmitter wave guide portion may also include a cavity for selecting the transmitter frequency, and/or adjustable phase shift means for controlling the length of the wave guide, and a wave generating tube such as a klystron or magnetron. The spacer and cavity of the receiver are of such construction that the receiver presents a high impedance to the transmitter frequency. The position of the cavity in the transmitter wave guide may be selected so that this portion presents a high impedance to the receiver frequency. The phase shifter in the transmitter wave guide may be used to control the effective length of this wave guide to reject the receiver frequency if a cavity is not used, or to reduce transmitter distortion caused by reflection from the cavity when a cavity is used. The two units are both connected to a single antenna through a wave guide of Y-configuration, with the branches connected to the units each including a phase shifter so that the effective length can be adjusted to reject the frequencies of the other unit. Each of the branches also includes a gate or switch structure adjacent the junction thereof with the antenna branch for cutting off the branch during tuning or other adjustment of the other branch. After one branch is so tuned, the other branch may again be connected and adjusted by the phase shifter to have the same effect on the one branch as when terminated by the gate. The wave guide branch connected to the antenna may include provisions for applying and deriving test signals therefrom and may also include power monitoring provisions to indicate proper operation of the equipment coupled thereto.

Figure 1:
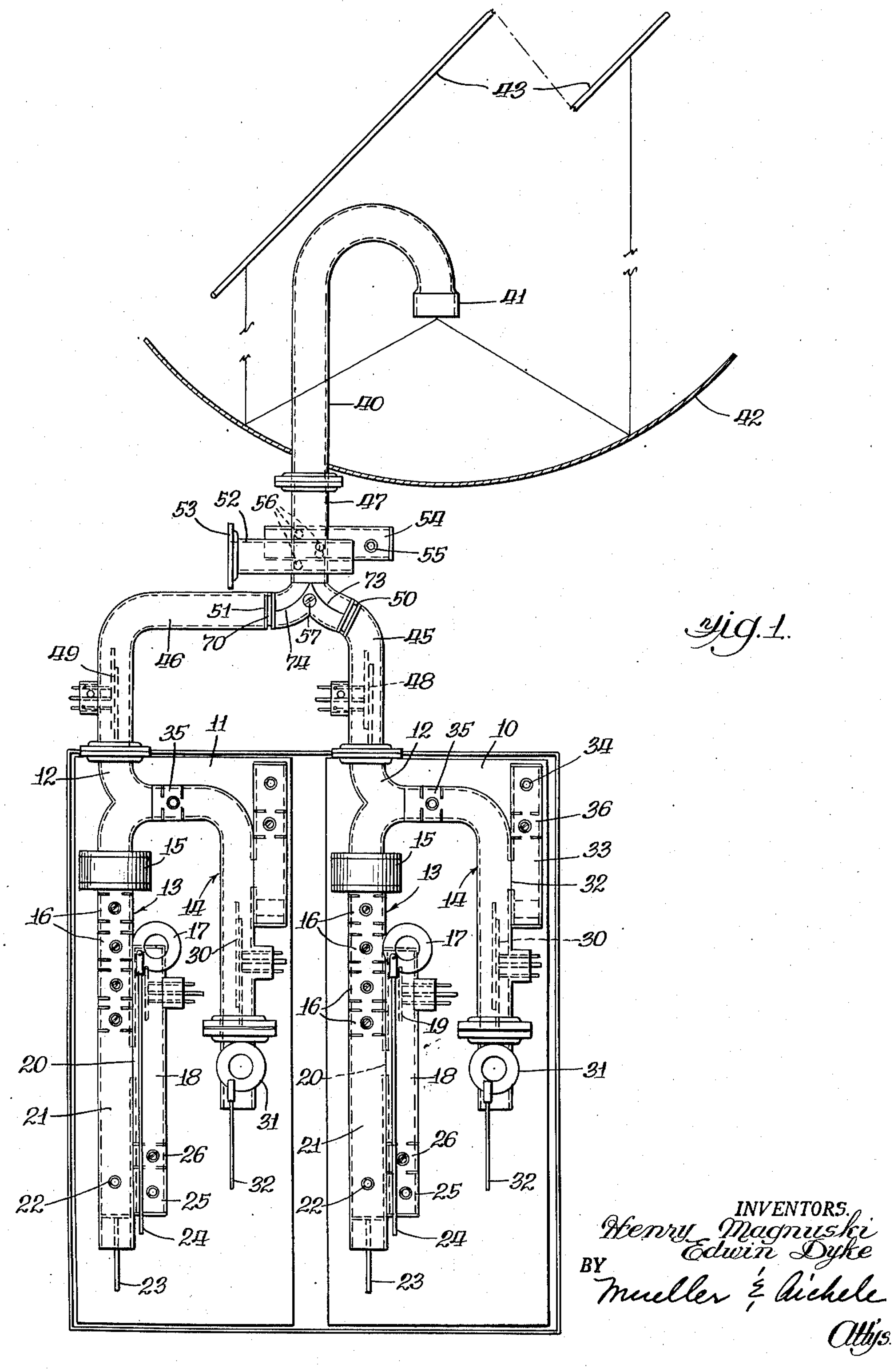
Fig. 1 illustrates the microwave transmitting and receiving apparatus in accordance with the invention including the antenna and wave guide coupling structure.

Referring now to the drawings, in Fig. 1 there is illustrated the overall structure including the main transmitter-receiver units 10 and 11. These units may be of a construction as disclosed and claimed in the copending application of Edwin Dyke, Serial No. 136,219, filed December 31, 1949, now Patent No. 2,699,548, issued January 11, 1955. Each of these units includes a wave guide structure having a common portion 12, a receiver portion 13, and a transmitter portion 14. The receiver portion includes a spacer 15 which may be selected to have proper length so that the receiver portion 13 forms a three-quarter wave shorted stub at the transmitter frequency and accordingly presenting a high impedance to this frequency so that it is not substantially attenuated. The receiver portion also includes a multi-section cavity filter 16 for selecting the receiver frequency. Although a four section cavity filter is illustrated, filters having a different number of sections may be suitable for various applications. A klystron or other tube 17 serves as a local oscillator and applies waves to the wave guide branch 18. The level of these waves may be controlled by variable attenuator 19. The waves are applied through directional coupler 20 to the wave guide portion 21 wherein they are mixed with the received waves passing through the cavity filter 16. The mixed waves are detected by the crystal detector 22 and applied to an intermediate frequency amplifier not shown. An adjustable termination for the mixer may be provided as indicated at 23. The frequency of the local oscillator 17 may be adjusted by the control rod 24 and the frequency thereof may be monitored by crystal 25 connected to the wave guide branch 18 through cavity 26.

Considering now the transmitter portion 14, this includes an adjustable phase shifter 30 for controlling the effective length so that the wave guide forms a stub which presents a high impedance to receiver frequencies. Signals are applied to the wave guide branch by the klystron or other tube 31, the frequency of which may be controlled by the control rod 32. The provision of an adjustable phase shifter is particularly important in the transmitter branch since the oscillator tube used in this branch may be of a construction that the reflection characteristics thereof differ with different tubes which may be used and compensation for this may be provided by the adjustable phase shifter 30. A small amount of the transmitter signal may be applied through directional coupler 32 to the wave guide 33 and through the frequency monitoring cavity 36 to a crystal detector 34 which serves as a monitor to indicate proper operation of the transmitter. A resonant cavity section 35 may be provided in the wave guide of the transmitter portion 14 when the various units of the system operate at closely spaced frequencies as will be described more in detail.

The transmitter-receiver unit 11 may be identical to the transmitter-receiver unit 10 except that the receiver and transmitter thereof will operate at different frequencies so that the spacer 15 of the two receiver units may be of different dimensions and the adjustable phase shifters 30 of the two units will probably be set at different positions because of the different frequencies involved. Systems in accordance with the invention have been used wherein the two transmitters operated at frequencies of 6415 and 6175 megacycles and the two receivers operated at frequencies of 6295 and 6055 megacycles, for example.

The two units are connected to antenna 40 which is of the wave guide type having a downwardly turned horn 41 which applies waves to, and picks up waves from, parabolic reflector 42, which in turn handles waves received from and applied to the 45° reflector 43. These waves are then applied substantially horizontally to the next station. For coupling the antenna 40 to the common wave guides 12 of the transmitter-receiver units there is provided a Y structure including branches 45, 46 and 47 which have a common junction. A tuning screw 57 is provided at the junction for controlling the characteristics of the branches 45 and 46. The wave guide structure includes an adjustable phase shifter 48 in the wave guide branch 45 and an adjustable phase shifter 49 in the branch 46. Switch or gate structures 50 and 51 are provided in the wave guide branches 45 and 46 respectively adjacent the junction thereof with the wave guide branch 47. Coupled to the wave guide branch 47 is a first wave guide section 52 having a flange 53 thereon for connecting test equipment for coupling signals to, or deriving signals from, the system. Also applied to the wave guide branch 47, on the other side thereof, is a wave guide section 54 which may include a crystal monitor 55 therein for providing an indication of the power of the waves from the two transmitters 31, as applied through the wave guide section 47 to the antenna 40.

The phase shifter 48 in the branch 45 may be adjusted so that branch 45 together with the transmitter-receiver unit 10 connected thereto form a stub presenting high impedance to the signals of the transmitter of the unit 11. Similarly, the phase shifter 49 may be adjusted so that the branch 46 together with the transmitter-receiver unit 11 form a stub presenting high impedance to the frequency of the transmitter of the unit 10. The branches so formed do not necessarily form shorted stubs for the frequencies of the receivers of the units. However, loss of the received signal can be prevented by the provision of transmitter cavities 35 in the transmitter sections of the units. The receiver cavities of the individual units will prevent introduction into each receiver of the frequency of the other receiver.

Figure 2:
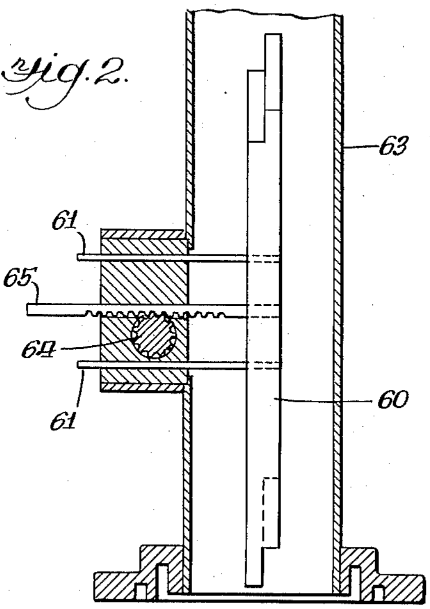
Fig. 2 is a detail view of a phase shifter as utilized in the system of Fig. 1.

Reference is now made to Fig. 2 which shows more in detail the construction of the adjustable phase shifter. The phase shifter includes a dielectric member 60 supported on rods 61 which slide in openings in block 62 connected to the wave guide 63. The position of the dielectric member 60 controls the phase shift produced thereby and may be controlled by movement of a pinion 64 which engages the rack 65 connected to the dielectric member 60. The phase shifters 30 of the transmitter-receiver units and also the phase shifters 48 and 49 in the wave guide coupling structure may all be of the construction shown in Fig. 2.

Figure 4:
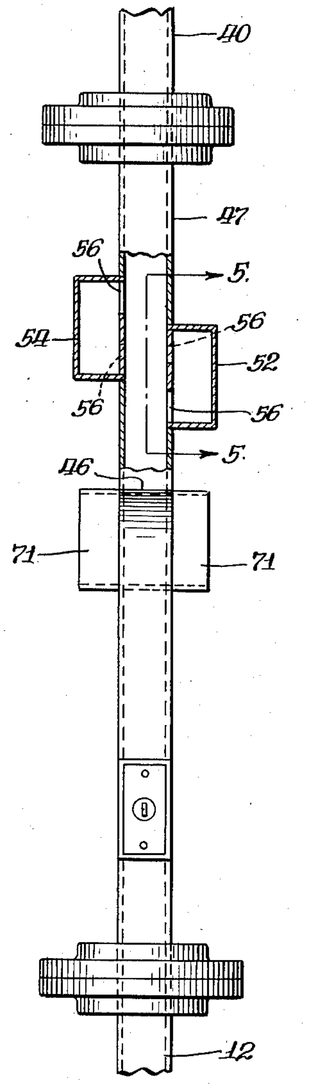
Fig. 4 illustrates the wave guide connecting structure with portions broken away to show the test and monitor provisions thereof.
Figure 3:
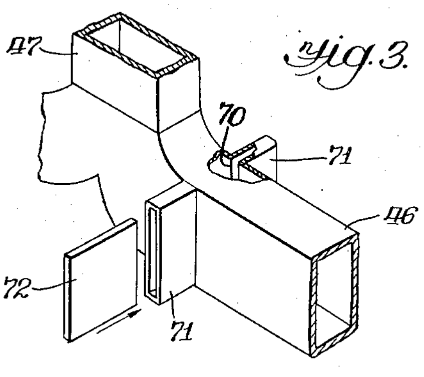
Fig. 3 is a detail view of the switch or gate means of Fig. 1.

As previously stated, the wave guide branches 45 and 46 may be cut off from the system by switch or gate structures. This structure is shown in Figs. 1, 3 and 4. Slits 70 are provided in the close spaced sides of the rectangular wave guide with channels 71 extending on either side thereof. A conducting plate 72 may be slid into the channels to completely close the wave guide. By making the length of the channels a quarter of a wave length at the frequencies involved, low series impedance results therefrom. The gates 50 are spaced from the junction thereof with the wave guide portion 47 so that each is an odd quarter wave length at the frequency of the transmitter connected to the other branch. That is, the distance indicated by the line 73 must be an odd quarter of a wave length at the frequency of the transmitter unit 11. Similarly, the distance 74 between the gate 71 and the wave guide branch 47 must be an odd quarter of a wave length at the frequency of the transmitter of the unit 10. Accordingly, when a gate is closed, the wave guide connected thereto will be cut off and the gate will reflect a high impedance at the transmitter frequency applied through the connected branch.

Figure 5:
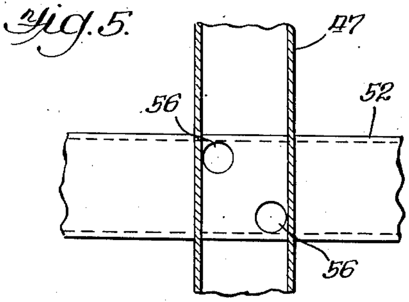
Fig. 5 is a detail view along the line 5—5 of Fig. 3.

Figs. 4 and 5 together with Fig. 1 illustrate the manner of coupling of the wave guides 52 and 54 to the branch 47 connected to the antenna. As best shown in Fig. 5 coupling holes 56 are provided which allow a small amount of the waves to pass from the main guide 47 into the connected guides 52 and 54. Conversely, signals from the flange 53 may be applied through the guide 52 to the guide 47. This permits the application of test signals to the system as well as the taking of signals therefrom.

Considering now the manner in which the wave guide structure is used to provide isolation of the various units in the system, each of the units 10 and 11 will be adjusted in the normal way so that the receiver branch thereof will form a high impedance at transmitting frequencies and the transmitting branch will form a high impedance at receiving frequencies. The phase shifters 30 are tuned so that the received signal is not substantially attenuated thereby and this can be accomplished by observing the limiter outputs of the receivers.

After the individual units are adjusted, the transmitter of unit 10 may be tuned by closing the gate structure 51 to cut off the wave guide branch 46. After tuning is accomplished, the gate 51 may be opened and the phase shifter 49 in the branch 46 adjusted so that the response is the same as when the gate 51 was closed. That is, the unit 11 together with the wave guide branch 46 will form an effective quarter wave shorted stub presenting a high impedance to the frequency transmitted by the unit 10. Similarly, the gate 50 may be closed while the transmitter of unit 11 is tuned and after this has been accomplished, the gate 50 may be opened and phase shifter 48 adjusted so that the branch 45 together with unit 10 form a high impedance stub at the transmitter frequency of the unit 10.

It is to be pointed out that the adjustment of phase shifters 48 and 49 do not necessarily prevent diversion of the received signal for one unit into the transmitter of the other unit. When the frequency spacing is adequate, this does not present a serious problem. However, when the units are closely spaced in frequency, it may be desired to provide transmitter cavities 35 which pass the transmitter frequencies but reject the frequency of the receiver of the other unit so that the received signals are not substantially attenuated by the transmitter portions. When cavities 35 are used for this purpose, the cavities are positioned to reflect the undesired frequencies and the phase shifters 30 are not required for this purpose. However, in such case the cavities 35 may produce reflections which cause distortion of the transmitter, and the phase shifters 30 or other suitable means may be used to control these reflections to minimize such distortion.

It is therefore seen that there is provided a system for providing dual transmission and dual reception from a single antenna. The system is arranged so that any one signal is not substantially attenuated by the equipment for handling the other signals. The equipment is easily adjusted to provide the desired operation.

It is to be pointed out that the equipment illustrated in Fig. 1 may be a terminal unit for a simple two-terminal communication system or an end terminal of a relay system. At relay stations two such units are required, one for communicating in each direction, with the signals from the receiver of one being coupled to the transmitter of the other and vice versa.

We claim:

1. Microwave radio apparatus including in combination, first and second transmitter-receiver units, antenna means, wave guide means for connecting said transmitter-receiver units to said antenna means for simultaneous operation of said units with said antenna means, said wave guide means including first, second and third branches interconnected at a common junction, said first and second wave guide branches being connected to said first and second transmitter-receiver units respectively, said third wave guide branch being connected to said antenna means, said first and second wave guide branches including gate means for blocking the same adjacent said junction, and phase shifter means in each of said first and second wave guide branches between said gate means and said transmitter-receiver units for changing the effective length of said first and second branches.

2. Microwave radio apparatus including in combination, first and second transmitter-receiver units, antenna means, wave guide means for connecting said first and second transmitter-receiver units to said antenna means for simultaneous operation of said units therewith, said waveguide means having first and second branches connected to a third branch at a common junction, said first and second wave guide branches being connected to said first and second transmitter-receiver units respectively, said third wave guide branch being connected to said antenna means, said wave guide means including a tuning screw at said junction for controlling the wave transmission characteristics thereof, said first and second wave guide branches including gate means for blocking the same adjacent said junction, and phase shifter means in each of said first and second wave guide branches between said gate means and said transmitter-receiver units for changing the effective length of said first and second branches.

3. Wave translating apparatus including in combination, first and second units operating at first and second frequencies, wave guide means including a structure including first, second and third branches, said first and second wave guide branches being connected to said first and second units respectively, wave handling means connected to said third wave guide branch, said wave guide means connecting said first and second units to said wave handling means so that said units both operate therewith at the same time, said first wave guide branch including gate means therein for selectively terminating the same adjacent the junction thereof with said third wave guide branch, said gate means being spaced from said junction of said first wave guide branch and said third wave guide branch by an odd multiple of a quarter wave length at said second frequency so that said first wave guide branch when terminated by said gate means presents a high impedance at said second frequency, and phase shifter means in said first wave guide branch between said gate means and said first unit for controlling the effective length of said first branch so that said first branch and said first unit connected thereto produce the same effect on said second unit as when terminated by said gate means.

4. Wave translating apparatus including in combination, first and second units operating at different frequencies, wave guide means including first, second and third branches, said first and second wave guide branches being connected to said first and second units respectively, wave handling means connected to said third wave guide branch, said wave guide means connecting said first and second units to said wave handling means so that said units both operate therewith at the same time, said first and second wave guide branches including first and second gate means respectively for terminating said branches adjacent the junction thereof with said third wave guide branch, said first gate means being spaced from said junction of said first wave guide branch and said third wave guide branch by an odd multiple of a quarter wave length at the frequency of said second unit so that said first wave guide branch presents a high impedance at said frequency when terminated by said gate means thereof, said second gate means being spaced from said junction of said second wave guide branch and said third wave guide branch by an odd multiple of a quarter wave length at the frequency of said first unit so that said second wave guide branch presents a high impedance at said frequency when terminated by said gate means thereof, and first and second phase shifter means in said first and second wave guide branches respectively between said gate means thereof and said units for controlling the effective length of said branches so that each of said branches and said unit connected thereto present a high impedance at the frequency of the other unit.

5. Microwave radio apparatus including in combination, first and second transmitter-receiver units, each of said units providing transmission and reception all at different frequencies, antenna means, wave guide means for connecting said transmitter-receiver units to said antenna means for simultaneous operation of said first and second units, said wave guide means including first, second and third branches interconnected at a common point, said first and second wave guide branches being connected to said first and second transmitter-receiver units respectively, said third wave guide branch being connected to said antenna means, said first and second wave guide branches including first and second gate means therein respectively for terminating the same adjacent the junction thereof with said third wave guide branch, said first gate means being spaced from said junction of said first wave guide branch and said third wave guide branch by an odd multiple of a quarter wave length at the transmitting frequency of said second unit so that said first gate means presents a high impedance at said transmitting frequency, said second gate means being spaced from said junction of said second wave guide branch and said third wave guide branch by an odd multiple of a quarter wave length at the transmitting frequency of said first unit so that said second gate means presents a high impedance at said transmitting frequency, and phase shifter means in each of said first and second wave guide branches between said gate means and said transmitter-receiver units for controlling the effective length of said first and second branches so that each of said branches and the unit connected thereto can be adjusted to produce the same effect on the other unit as when terminated by said gate means thereof.

6. Microwave radio apparatus including in combination, first and second transmitter-receiver units, said units providing transmission and reception all at different frequencies, antenna means, wave guide means for connecting said transmitter-receiver units to said antenna means for simultaneous operation of said units with said antenna means, said waveguide means including a structure having a Y junction with first, second and third branches extending therefrom, said first, and second wave guide branches being connected to said first and second transmitter-receiver units respectively, said third wave guide branch being connected to said antenna means, and phase shifter means in each of said first and second wave guide branches between said gate means and said transmitter-receiver units for controlling the effective length of said first and second branches so that each of said branches and the unit connected thereto form a high impedance stub which rejects waves transmitted from the other unit through the other wave guide branch to said antenna.

7. Microwave radio apparatus including in combination, first and second transmitter-receiver units, antenna means, and wave guide means for connecting said transmitter-receiver units to said antenna means for simultaneous operation therewith, said waveguide means having a Y junction with first, second and third branches, extending therefrom, said transmitter-receiver units each including a main wave guide having first and second wave guide portions extending therefrom, said first wave guide portion including cavity filter means and receiver means connected thereto, said second wave guide portion including cavity filter means and transmitter means connected thereto, said first and second wave guide branches being individually connected to said main wave guides of said first and second transmitter-receiver units respectively, said third wave guide branch being connected to said antenna means, said first and second wave guide branches including gate means for blocking the same adjacent the junction thereof with said third wave guide branch, and phase shifter means in each of said first and second wave guide branches between said gate means and the connection thereof to said transmitter-receiver units.

8. Microwave radio apparatus including in combination, a first transmitter-receiver unit adapted to transmit at a first frequency and receive at a second frequency, a second transmitter-receiver unit adapted to transmit at a third frequency and receive at a fourth frequency, antenna means, wave guide means for connecting said transmitter-receiver units to said antenna means for simultaneous transmission at said first and third frequencies and reception at said second and fourth frequencies, said waveguide means having first, second and third branches extending from a common junction, said transmitter-receiver units each including a main wave guide having transmitter and receiver wave guide portions extending therefrom, said receiver wave guide portion presenting a high impedance to the frequency of the transmitter of the same unit, said transmitter wave guide portion including an adjustable phase shifter for adjusting the effective length of said transmitter wave guide portion to present a high impedance to the frequency of the receiver of the same unit, said first and second wave guide branches being connected to said common wave guides of said first and second transmitter-receiver units respectively, said third wave guide branch being connected to said antenna means, said first and second wave guide branches including gate means for terminating the same adjacent the junction thereof with said third wave guide branch, first phase shifter means in said first wave guide branch between said gate means and the connection to said first transmitter-receiver units for controlling the effective length of said first branch and said unit connected thereto so that said third frequency is rejected thereby, and second phase shifter means in said second wave guide branch between said gate means and the connection to said second transmitter-receiver unit for controlling the effective length of said second branch and said unit connected thereto so that said first frequency is rejected thereby.

9. Microwave radio apparatus including in combination, a first transmitter-receiver unit adapted to transmit at a first frequency and receive at a second frequency, a second transmitter-receiver unit adapted to transmit at a third frequency and receive at a fourth frequency, antenna means, wave guide means for connecting said first and second transmitter-receiver units to said antenna means for simultaneous operation thereof at said first, second, third and fourth frequencies, said waveguide means having first, second and third branches interconnected at a common junction, said transmitter-receiver units each including a main wave guide having transmitter and receiver wave guide portions extending therefrom, said receiver wave guide portion presenting a high impedance to the frequency of the transmitter of the same unit and selecting the receiver frequency, said transmitter wave guide portion including cavity filter means for selecting the transmitter frequency and for rejecting the frequency of the receiver of the same unit, said first and second wave guide branches being individually connected to said main wave guides of said first and second transmitter-receiver units respectively, said third wave guide branch being connected to said antenna means, first phase shifter means in said first wave guide branch between said common junction of said waveguide branches and the connection of said first branch to said first transmitter-receiver unit for controlling the effective length of said first branch and the unit connected thereto so that said third frequency is rejected thereby, and second phase shifter means in said second wave guide branch between said common junction of said waveguide branches and the connection of said second branch to said second transmitter-receiver unit for controlling the effective length of said second branch and the unit connected thereto so that said first frequency is rejected thereby.

10. Microwave radio apparatus including in combination, a first transmitter-receiver unit adapted to transmit at a first frequency and receive at a second frequency, a second transmitter-receiver unit adapted to transmit at a third frequency and receive at a fourth frequency, antenna means, wave guide means for connecting said first and second transmitter-receiver units to said antenna means for simultaneous transmission at said first and third frequencies and reception at said second and fourth frequencies, said waveguide means having a Y junction with first, second and third branches extending therefrom, said transmitter-receiver units each including a main wave guide having transmitter and receiver wave guide portions extending therefrom, said receiver wave guide portion presenting a high impedance to the frequency of the transmitter of the same unit and selecting the receiver frequency, said transmitter wave guide portion including cavity filter means for selecting the transmitter frequency and rejecting the receiver frequency and means for controlling the reflections from said cavity filter means on said transmitter frequency, said first and second wave guide branches being individually connected to said main wave guides of said first and second transmitter-receiver units respectively, said third wave guide branch being connected to said antenna means, said first and second waveguide branches each including gate means for terminating the same adjacent the junction thereof with said third waveguide branch, first phase shifter means in said first wave guide branch between said gate means and the connection to said transmitter-receiver units for controlling the effective length of said first branch and the unit connected thereto so that said third frequency is rejected thereby, and second phase shifter means in said second wave guide branch between said gate means and the connection to said transmitter-receiver unit for controlling the effective length of said second branch and the unit connected thereto so that said first frequency is rejected thereby.

References Cited in the file of this patent

UNITED STATES PATENTS

| | | |
|---|---|---|
| 2,595,680 | Lewis | May 6, 1952 |
| 2,629,048 | Dyke et al. | Feb. 17, 1953 |
| 2,699,548 | Dyke | Jan. 11, 1955 |
| 2,703,866 | De La Cova et al. | Mar. 8, 1955 |